US012808752B2

(12) United States Patent
Kanai et al.

(10) Patent No.: US 12,808,752 B2
(45) Date of Patent: Nov. 24, 2026

(54) ROLLING BEARING ABNORMALITY DETECTION DEVICE AND ROLLING BEARING ABNORMALITY DETECTION METHOD

(71) Applicant: KOBE STEEL, LTD., Hyogo (JP)

(72) Inventors: Keita Kanai, Kobe (JP); Toru Okada, Kobe (JP); Kazuo Yamaguchi, Takasago (JP)

(73) Assignee: KOBE STEEL, LTD., Hyogo (JP)

( * ) Notice: Subject to any disclaimer, the term of this patent is extended or adjusted under 35 U.S.C. 154(b) by 274 days.

(21) Appl. No.: 18/721,411

(22) PCT Filed: Oct. 24, 2022

(86) PCT No.: PCT/JP2022/039531
§ 371 (c)(1),
(2) Date: Jun. 18, 2024

(87) PCT Pub. No.: WO2023/127248
PCT Pub. Date: Jul. 6, 2023

(65) Prior Publication Data

US 2025/0060279 A1 Feb. 20, 2025

(30) Foreign Application Priority Data

Dec. 27, 2021 (JP) ................................ 2021-212423

(51) Int. Cl.
*G01M 13/045* (2019.01)

(52) U.S. Cl.
CPC ................................ *G01M 13/045* (2013.01)

(58) Field of Classification Search
CPC ..... G01M 13/045; G01M 13/04; G01H 1/003
See application file for complete search history.

(56) References Cited

U.S. PATENT DOCUMENTS

2017/0343451 A1* 11/2017 Yoshida ................ G01H 1/003

FOREIGN PATENT DOCUMENTS

JP 2017-101954 A 6/2017

OTHER PUBLICATIONS

Translation of Written Opinion of the International Searching Authority; PCT/JP2022/039531; mailed on Dec. 27, 2022.

* cited by examiner

*Primary Examiner* — Timothy P Graves
(74) *Attorney, Agent, or Firm* — Studebaker Brackett PLLC

(57) ABSTRACT

A bearing abnormality detection device and a bearing abnormality detection method in the present invention include: obtaining a frequency spectrum of vibration data of a vibration in a rolling bearing; detecting, from the obtained frequency spectrum, a peak frequency within a predetermined frequency range including a theoretical frequency showing a peak on the frequency spectrum in an occurrence of an abnormality; and determining whether an abnormality is present on the basis of a chronological frequency change amount that is a difference between a preset reference frequency being a reference of the peak frequency and the detected peak frequency.

6 Claims, 9 Drawing Sheets

ROLLING BEARING ABNORMALITY DETECTION DEVICE AND ROLLING BEARING ABNORMALITY DETECTION METHOD

TECHNICAL FIELD

The present invention relates to a rolling bearing abnormality detection device and a rolling bearing abnormality detection method for detecting an abnormality occurring in a rolling bearing.

BACKGROUND ART

A rolling bearing supports a load with a rolling element, e.g., a ball or a roller, disposed between two members (a shaft and a bearing ring), and is adaptable to any implement including a rotator for various purposes. The rolling bearing may be hindered from smoothly rolling due to abnormalities, such as abrasion (wearing out or a flaw), fatigue attributed to deformation, and fusion attributed to a pressure, which may result in causing a failure of the implement. To avoid such a situation, Patent Literature 1 proposes, for example, monitoring an abnormality in the rolling bearing.

A method for evaluating a mechanical implement disclosed in Patent Literature 1 is a method for evaluating a mechanical implement by confirming presence or absence of an abnormality and specifying an abnormal portion in the mechanical implement where a rotator rotates relative to a stationary member. The method includes: a detection step of detecting a sound or a vibration generated in the mechanical implement to output an electric signal corresponding to the detected sound or vibration; an arithmetic processing step of analyzing a frequency of the electric signal and obtaining spectrum data; a maximal value extraction step of extracting a maximal value from the spectrum data; a baseline calculation step of obtaining a baseline on the basis of effective spectrum data excluding the maximal value from the spectrum data; a peak frequency extraction step of extracting a peak frequency in which a difference between the maximal value and the baseline is larger than a predetermined value; a theoretical frequency calculation step of calculating, from rotation information about the rotator, a theoretical frequency showing a peak value on a frequency spectrum in an occurrence of an abnormality up to a predetermined order for each of mechanical elements of the mechanical implement; a detection frequency range determination step of obtaining a minimal frequency difference that is a minimal difference between theoretical frequencies among the mechanical elements up to at least one order, and setting the minimal frequency difference×a detection range coefficient defined as 0.5 or less at any order to a detection frequency range; a determination step of determining whether the peak frequency falls within a range of the theoretical frequency±the detection frequency range; and an abnormality diagnosis step of specifying an abnormal portion of the mechanical element on the basis of a result of the determination step.

The method for evaluating a mechanical implement disclosed in Patent Literature 1 includes: extracting a peak frequency in which a difference between the maximal value and the baseline is larger than the predetermined value; determining a normality when the peak frequency is outside the range of the theoretical frequency±the detection frequency range; and determining an abnormality when the peak frequency falls within the range of the theoretical frequency±the detection frequency range (see paragraph [0048] of Patent Literature 1). It is noted here that different structures of implements each adopting such a rolling bearing have different degrees of vibrations attributed to possible abnormalities in the rolling bearing. An abnormality may be hence overlooked depending on a setting of a threshold for extracting a peak frequency.

CITATION LIST

Patent Literature

Patent Literature 1: Japanese Unexamined Patent Publication No. 2017-101954

SUMMARY OF INVENTION

The present invention has been accomplished in view of the circumstances described above, and an object of the present invention is to provide a rolling bearing abnormality detection device and a rolling bearing abnormality detection method for appropriately detecting an abnormality in a roll bearing.

A bearing abnormality detection device and a bearing abnormality detection method according to the present invention include: detecting a vibration in a rolling bearing as vibration data; obtaining a frequency spectrum of the detected vibration data; detecting, from the obtained frequency spectrum, a peak frequency that is a frequency showing a peak within a predetermined frequency range including a theoretical frequency showing a peak on the frequency spectrum in an occurrence of an abnormality; obtaining a chronological frequency change amount that is a difference between a preset reference frequency being a reference of the peak frequency and the detected peak frequency; and determining, on the basis of the obtained chronological frequency change amount, whether an abnormality is present in the rolling bearing.

The object, other objects, features, and advantages of the present invention will be clarified by the following detailed description and the accompanying drawings.

DESCRIPTION OF EMBODIMENTS

Figure 1:
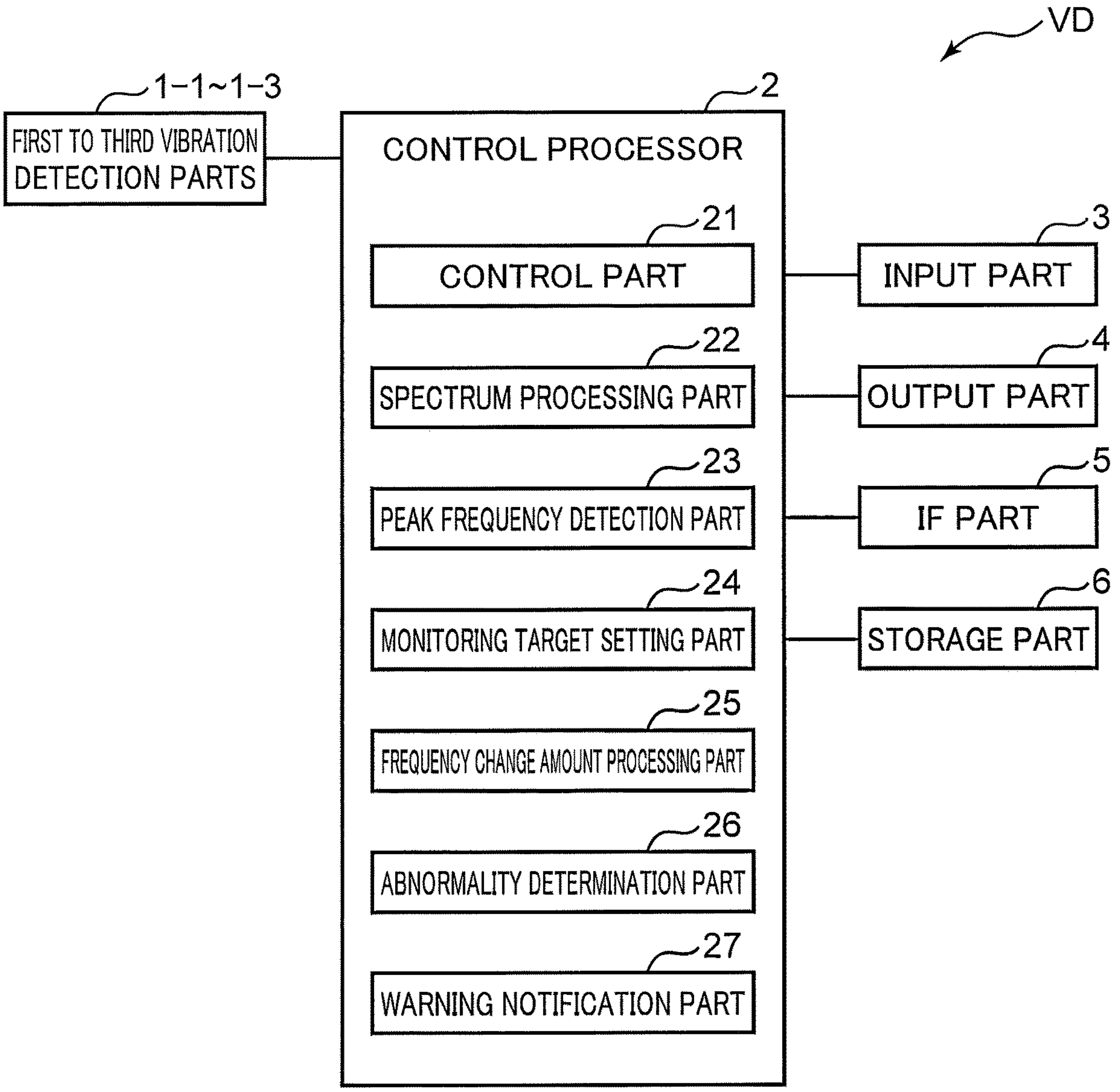
FIG. 1 is a block diagram showing a configuration of a rolling bearing abnormality detection device according to an embodiment.

Hereinafter, one or more embodiments of the present invention will be described with reference to the accompanying drawings. However, the scope of the present invention is not limited to the disclosed embodiments. Elements denoted by the same reference numerals in the drawings have the same configuration and, therefore, repeated descriptions will be appropriately omitted. In the present specification, elements are denoted by a same reference numeral when being referred to collectively, and are denoted by a same reference numeral accompanied by a different respective reference character when being referred to individually.

A rolling bearing abnormality detection device in an embodiment includes: a vibration detection part that detects a vibration in a rolling bearing as vibration data; a spectrum processing part that obtains a frequency spectrum of the vibration data detected by the vibration detection part; a peak frequency detection part that detects, from the frequency spectrum obtained by the spectrum processing part, a peak frequency that is a frequency showing a peak within a predetermined frequency range including a theoretical frequency showing a peak on the frequency spectrum in an occurrence of an abnormality; a frequency change amount processing part that obtains a chronological frequency change amount that is a difference between a preset reference frequency being a reference of the peak frequency and the peak frequency detected by the peak frequency detection part; and an abnormality determination part that determines, on the basis of the chronological frequency change amount obtained by the frequency change amount processing part, whether an abnormality is present in the rolling bearing. Hereinafter, the embodiment will be described in more detail.

Figure 2:
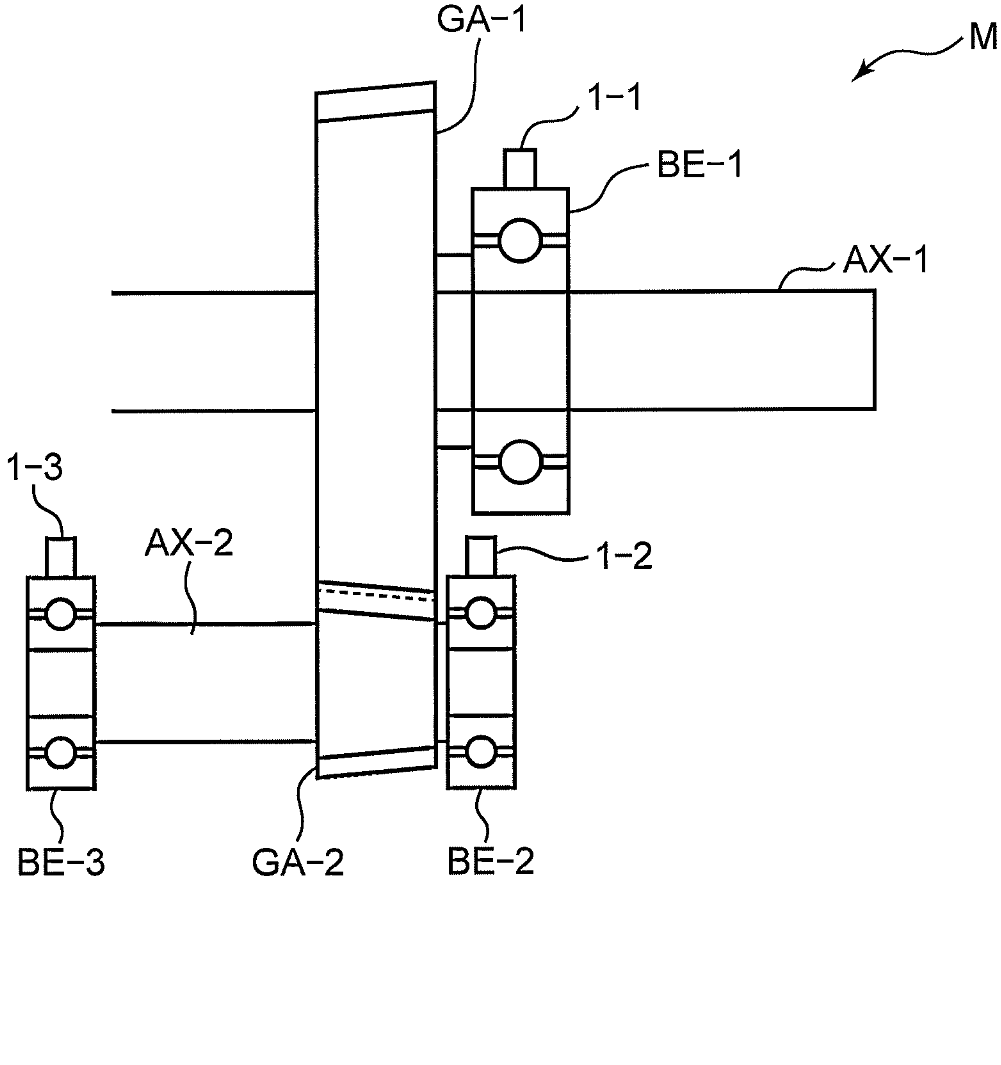
FIG. 2 is an explanatory view of a mechanical implement including a rolling bearing.
Figure 3:
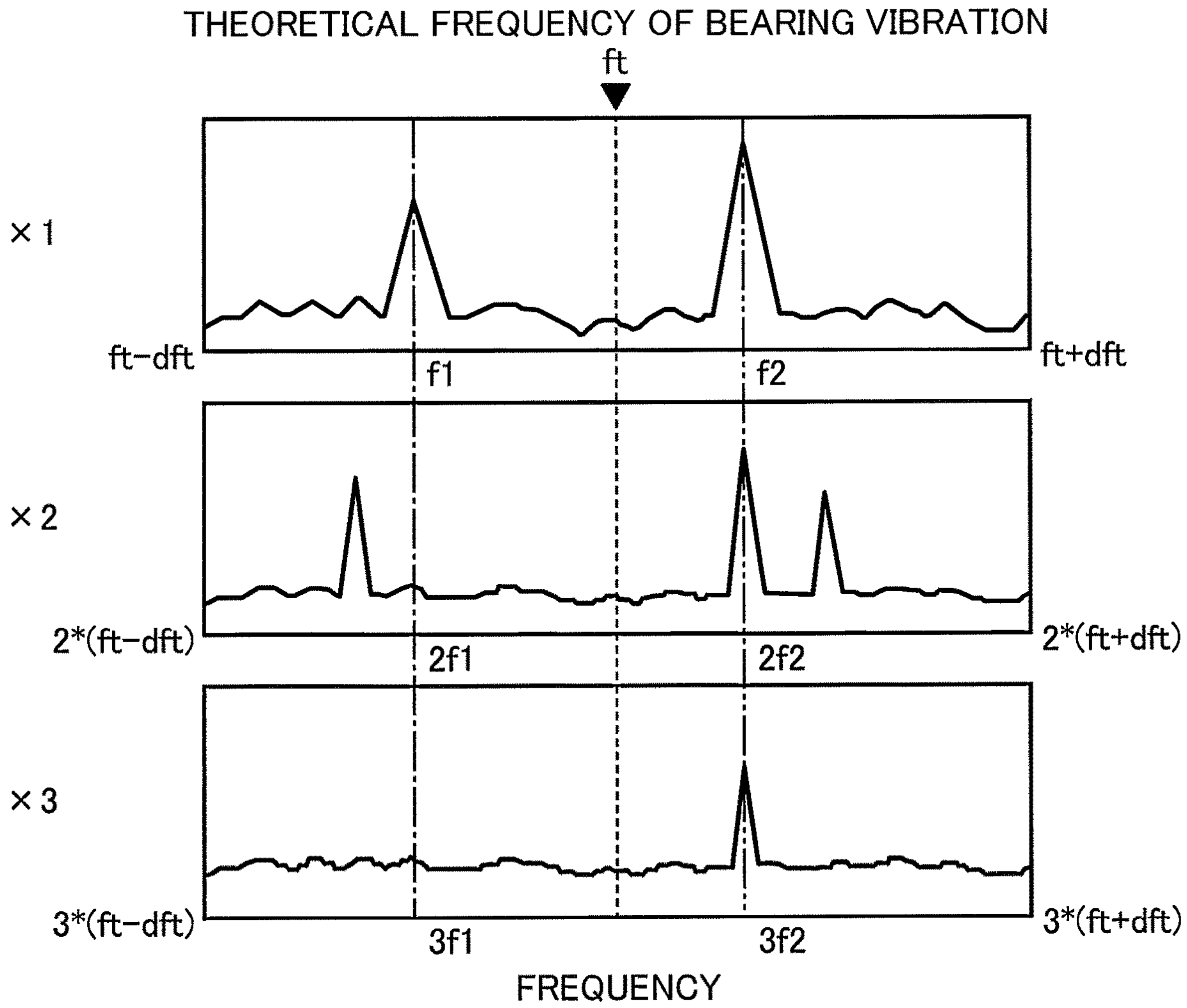
FIG. 3 is a schematic graph for describing a way of specifying a setting peak frequency.
Figure 4:
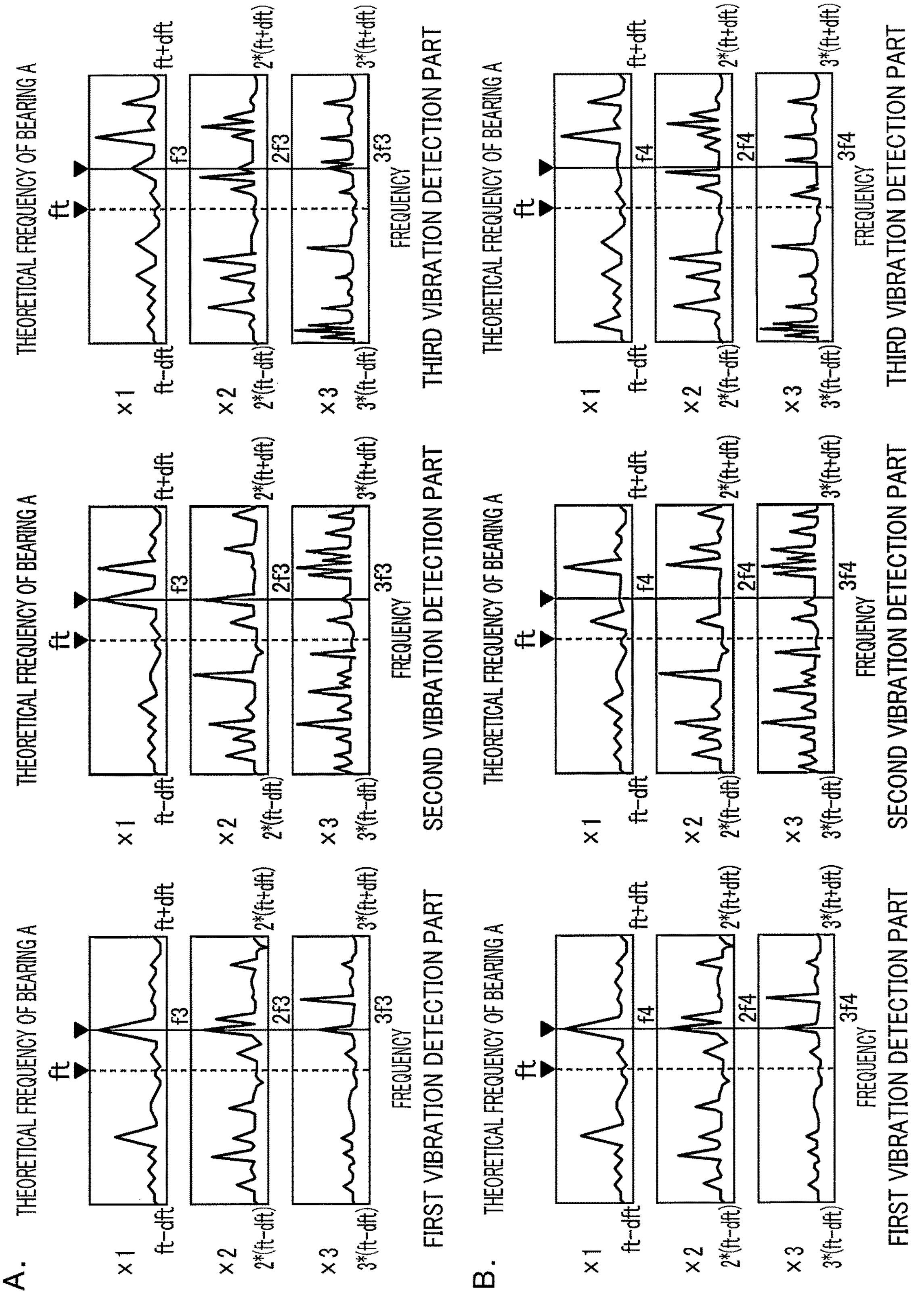
FIG. 4 includes schematic graphs for each describing a way of specifying a setting peak frequency in use of a plurality of vibration detection parts.
Figure 5:
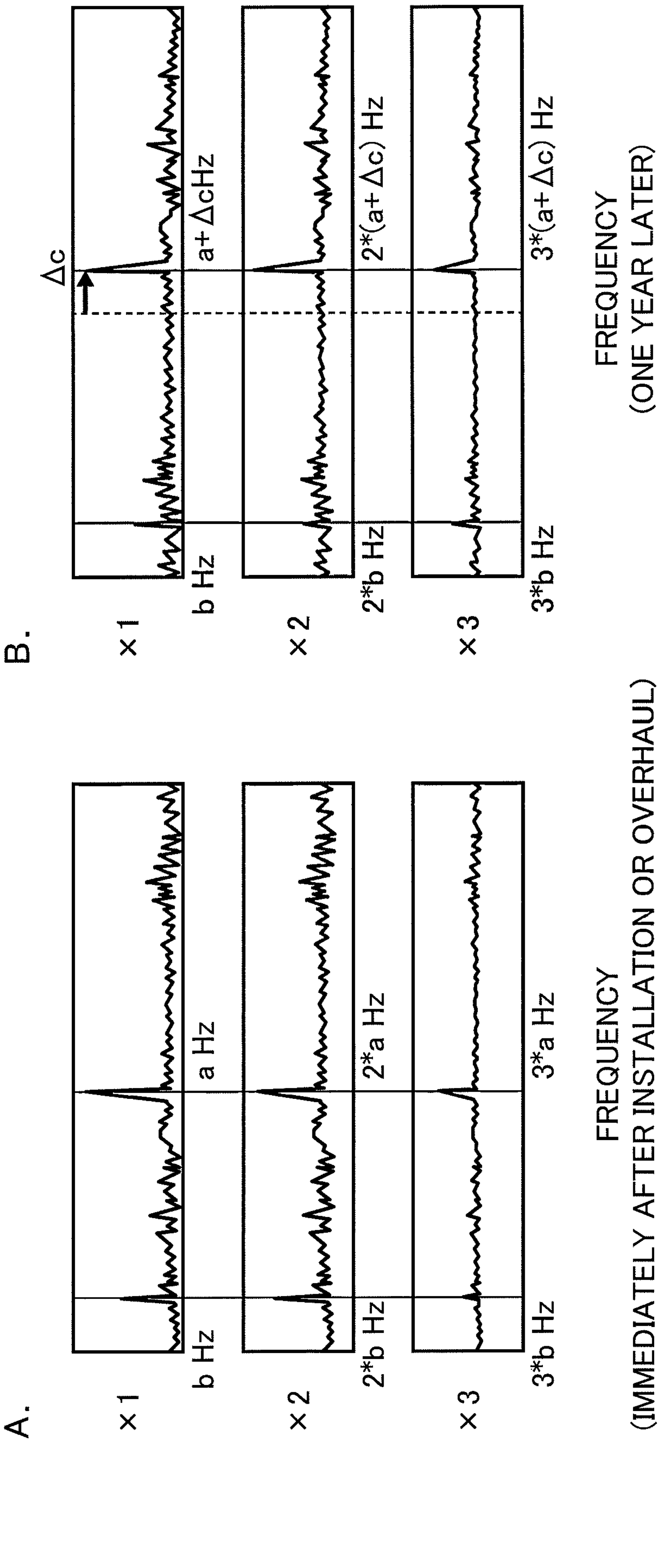
FIG. 5 includes schematic graphs for each describing a first way of setting a monitoring peak frequency.
Figure 6:
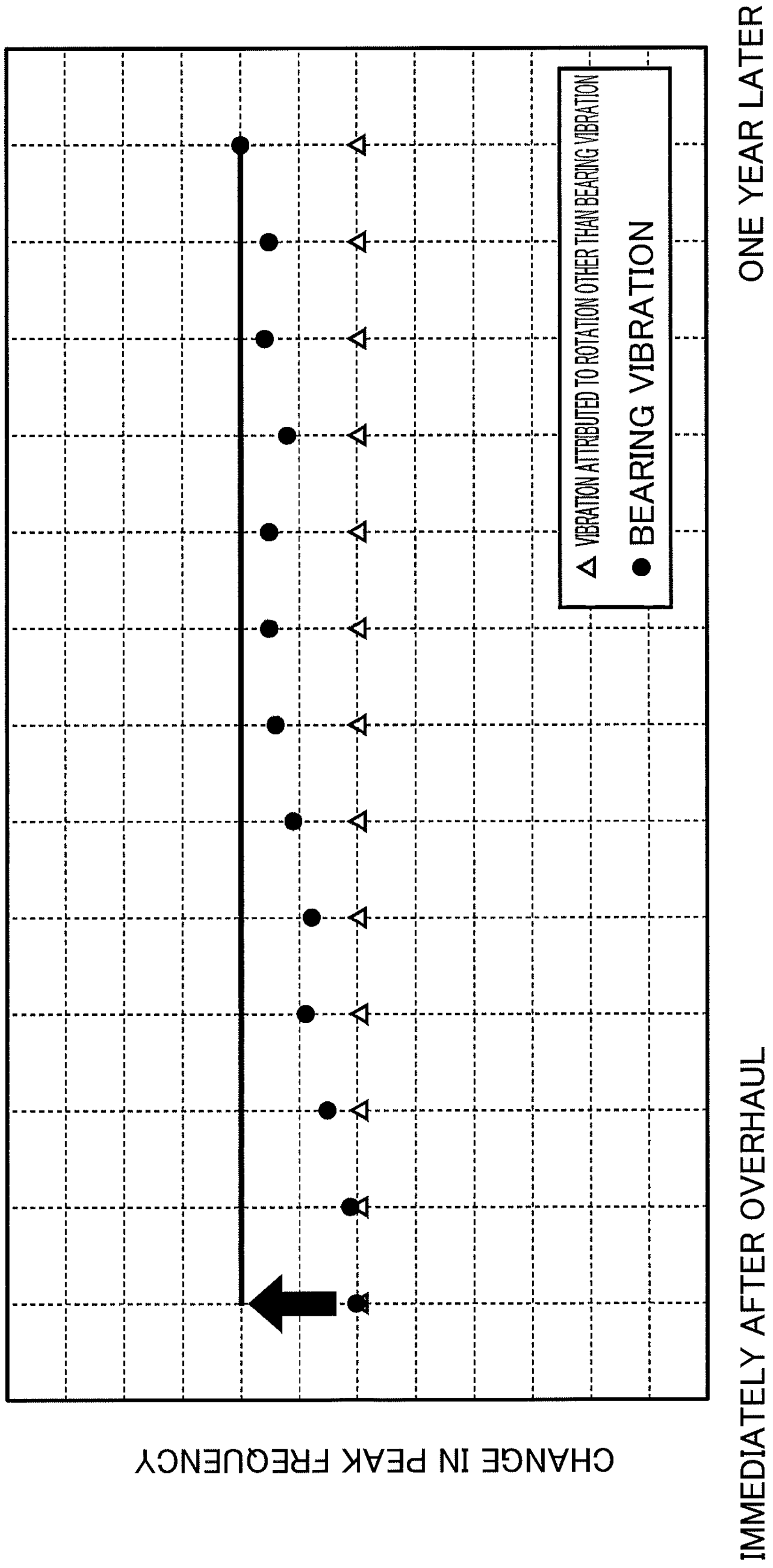
FIG. 6 is a schematic graph for describing a second way of setting a monitoring peak frequency.
Figure 7:
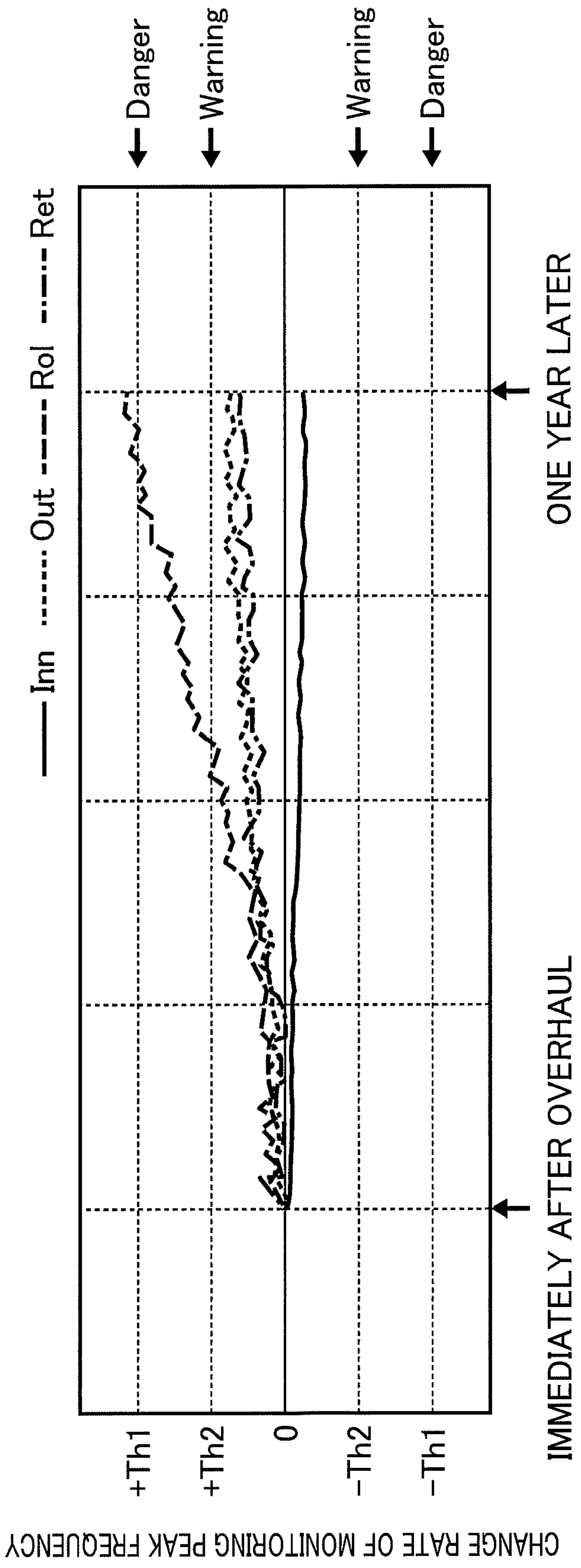
FIG. 7 is a graph for describing a way of determining an abnormality.

FIG. 1 is a block diagram showing a configuration of a rolling bearing abnormality detection device according to the embodiment. FIG. 2 is an explanatory view of a mechanical implement including the rolling bearing. FIG. 3 is a schematic graph for describing a way of specifying a setting peak frequency. A top in FIG. 3 shows a frequency spectrum within a frequency range of a theoretical frequency ft, and the top in FIG. 3 shows a frequency spectrum within a frequency range ft−dft to ft+dft of the theoretical frequency ft. A middle in FIG. 3 shows a frequency spectrum within a frequency range 2*ft−2*dft to 2*ft+2*dft two times the theoretical frequency ft. A bottom in FIG. 3 shows a frequency spectrum within a frequency range 3*ft−3*dft to 3*ft+3*dft three times the theoretical frequency ft. In each drawing, a horizontal axis represents a frequency and a vertical axis represents a level (magnitude). FIG. 4 includes schematic graphs for each describing a way of specifying a setting peak frequency in use of a plurality of vibration detection parts. FIG. 4A shows a first case where a setting peak frequency can be specified. FIG. 4B shows a second case where a setting peak frequency cannot be specified. FIG. 4A and FIG. 4B each show frequency spectrums obtained from vibration data about a first vibration detection part 1-1, frequency spectrums obtained from vibration data about a second vibration detection part 1-2, and frequency spectrums obtained from vibration data about a third vibration detection part 1-3 in order from the left to the right in the plane of the drawings. Top, middle, and bottom are similar to those in FIG. 3, respectively, and a horizontal axis and a vertical axis of each of these drawings are also similar to those in FIG. 3. FIG. 5 includes schematic graphs for each describing a first way of setting the monitoring peak frequency. FIG. 5A shows frequency spectrums immediately after new installation or overhaul, that is, frequency spectrums in a healthy state of the rolling bearing. Shown are frequency spectrums after one year from the case illustrated in FIG. 5A, that is, frequency spectrums after aging or frequency spectrums after a lapse of predetermined period. Top, middle, and bottom are similar to those in FIG. 3, respectively, and a horizontal axis and a vertical axis of each of these drawings are also similar to the axes in FIG. 3. FIG. 6 is a schematic graph for describing a second way of setting a monitoring peak frequency. In FIG. 6, a horizontal axis represents an elapsed time and a vertical axis represents a change rate of the peak frequency. FIG. 7 is a graph for describing a way of determining an abnormality. In FIG. 7, a horizontal axis represents an elapsed time and a vertical axis represents a change rate of the monitoring peak frequency.

For example, as shown in FIG. 1, a rolling bearing abnormality detection device VD according to the embodiment includes vibration detection parts 1 (1-1 to 1-3), a control processor 2, an input part 3, an output part 4, an interface part (IF part) 5, and a storage part 6.

Each vibration detection part 1 is connected to the control processor 2 and detects a vibration in a rolling bearing as vibration data under the control of the control processor 2. Although the number of vibration detection parts 1 may be one, a plurality of vibration detection parts, that is, three vibration detection parts from first to third vibration detection parts 1-1 to 1-3 are provided in one example in the embodiment. The first to third vibration detection parts 1-1 to 1-3 are arranged in an implement, e.g., a mechanical implement, including a rolling bearing, for which an abnormality is detected.

The mechanical implement is an example implement including a rolling bearing, and may be any other implement including a rolling bearing. For instance, a mechanical implement M serves as a gear reducer M illustrated in FIG. 2, and generally includes first to third rolling bearings BE-1 to BE-3, first and second rotation shafts AX-1 and AX-2, first and second gears GA-1 and GA-2, and an unillustrated housing that houses the first to third rolling bearings BE-1 to BE-3, the first and second rotation shafts AX-1 and AX-2, and the first and second gears GA-1 and GA-2. The first rotation shaft AX-1 is fixed to the first gear GA-1, is a rotation shaft of the first gear GA-1, and is supported by the first rolling bearing BE-1. The second rotation shaft AX-2 is fixed to the second gear GA-2, is a rotation shaft of the second gear GA-1, and is supported by the second and third rolling bearings BE-2 and BE-3. The first gear GA-1 and the second gear GA-2 are meshed with each other, and the first rotation shaft AX-1 rotates, for example, to generate a rotational force which is transmitted to the second rotation shaft AX-2 via the first and second gears GA-1 and GA-2 to thereby rotate the second rotation shaft AX-2.

In the gear reducer M having this configuration, the first to third vibration detection parts 1-1 to 1-3 are arranged on the outer circumferences of the first to third rolling bearings BE-1 to BE-3, respectively. The vibration detection parts 1 may be arranged, for example, in the housing without limitation to such positions in the rolling bearings BE. In short, the vibration detection parts 1 (1-1 to 1-3) are at locations where vibrations caused by the rolling bearings BE propagate. The vibration detection parts 1 (1-1 to 1-3) include, for example, acceleration sensors, acoustic emission (AE) sensors, or other sensors. That is to say, appropriate sensors are used in accordance with frequencies of vibrations to be detected. The vibration detection parts 1 (1-1 to 1-3) output detection results as vibration data to the control processor 2.

The input part 3 is connected to the control processor 2 and inputs, into the rolling bearing abnormality detection device VD, various commands, e.g., a command for instructing an operation mode, a command for instructing a start of specifying of a monitoring peak frequency, and a command for instructing a start of detection of an abnormality (start of monitoring), and various data, such as a mechanical implement name of a detection target (monitoring target), necessary for operating the rolling bearing abnormality detection device VD. Examples of the input part 3 include a plurality of input switches to which predetermined functions are assigned, a keyboard, and a mouse. The output part 4 is connected to the control processor 2 and outputs commands and data input from the input part 3, vibration data, and the like under the control of the control processor 2. Examples of the output part 4 include a display device, such as a cathode ray tube (CRT) display, a liquid crystal display, and an organic electroluminescence (EL) display, and a printing device, such as a printer.

The input part 3 and the output part 4 may constitute a so-called touch screen. In the configuration of the touch screen, the input part 3 serves as a position input device that detects and inputs an operation position of, for example, a resistive film type or an electrostatic capacitive type, and the output part 4 serves as a display device. This touch screen is provided with the position input device on a display surface of the display device, and displays one or more input content candidates that can be input into the display device. When a user touches a display position where an input content desired to be input is displayed, the position input device detects the position, and the display content displayed at the detected position is input into the rolling bearing abnormality detection device VD as a user's operation input content. Such a touch screen allows the user to understand an input operation intuitively and easily. This results in making the rolling bearing abnormality detection device VD user-friendly.

The IF part 5 is a circuit that is connected to the control processor 2 and inputs and outputs data into and from an external device under the control of the control processor 2, and is, for example, an interface circuit of RS-232C which is a serial communication way, an interface circuit using the Bluetooth (registered trademark) standard, an interface circuit that performs infrared communication using an Infrared Data Association (IrDA) standard or other standard, or an interface circuit using a Universal Serial Bus (USB) standard. Further, the IF part 5 may be a circuit that communicates with an external device, and may be, for example, a data communication card, or a communication interface circuit conforming to the Institute of Electrical and Electronics Engi (IEEE) 802.11 standard.

The storage part 6 is a circuit that is connected to the control processor 2 and stores various predetermined programs and various kinds of predetermined data under the control of the control processor 2. The various predetermined programs include, for example, control processing programs. The control processing programs include: a control program for controlling each of the parts 1 and 3 to 6 of the rolling bearing abnormality detection device VD in accordance with a function of each part; a spectrum processing program for obtaining a frequency spectrum of vibration data detected by each of the vibration detection parts 1 (1-1 to 1-3); a peak frequency detection program for specifying, from the frequency spectrum obtained by the spectrum processing program, a peak frequency that is a frequency showing a peak within a predetermined frequency range including a theoretical frequency showing a peak on the frequency spectrum in an occurrence of an abnormality; a frequency change amount processing program for obtaining a chronological frequency change amount that is a difference between a preset reference frequency being a reference of the peak frequency and the peak frequency detected by the peak frequency detection program; an abnormality determination program for determining, on the basis of the chronological frequency change amount obtained by the frequency change amount processing program, whether an abnormality is present in the rolling bearing; a warning notification program for making a notification of a warning to an outside by outputting the warning from the output part 4 when it is determined that an abnormality is present in the rolling bearing by the abnormality determination program; and a monitoring target setting program for setting, in a monitoring peak frequency setting mode of setting a monitoring peak frequency, the setting peak frequency to the monitoring peak frequency when the setting peak frequency detected by the peak frequency detection program chronologically changes. The various kinds of predetermined data include data necessary for executing these programs on, for example, vibration data detected by the vibration detection parts 1 (1-1 to 1-3), the theoretical frequency, the peak frequency detected by the peak frequency detection program, and the monitoring peak frequency set by the monitoring target setting program. The storage part 6 includes, for example, a read only memory (ROM) that is a nonvolatile storage element, an electrically erasable programmable read only memory (EEPROM) that is a rewritable nonvolatile storage element, or other storage element. The storage part 6 includes a random access memory (RAM) serving as a so-called working memory of the control processor 2 that stores data and the like generated in execution of the predetermined programs. The storage part 6 may include a hard disk device capable of storing a large capacity of data to store learning data having a relatively large amount.

The control processor 2 is a circuit that controls each of the parts 1 and 3 to 6 of the rolling bearing abnormality detection device VD in accordance with the function of each of the parts to detect an abnormality in the rolling bearing (an abnormality in the mechanical implement including the rolling bearing). The control processor 2 includes, for example, a central processing part (CPU) and its peripheral circuits. The control processor 2 is configured to functionally include a control part 21, a spectrum processing part 22, a peak frequency detection part 23, a monitoring target setting part 24, a frequency change amount processing part 25, an abnormality determination part 26, and a warning notification part 27 by executing the control processing programs.

The control part 21 controls each of the parts 1 and 3 to 6 of the rolling bearing abnormality detection device VD in accordance with the function of each of the parts to entirely control the rolling bearing abnormality detection device VD. The control part 21 executes a control in accordance with an operation mode of the rolling bearing abnormality detection device VD. In the embodiment, the rolling bearing abnormality detection device VD determines presence or absence of an abnormality in the rolling bearing after setting the monitoring peak frequency. The operation mode includes an abnormality monitoring mode of monitoring the rolling bearing (the mechanical implement including the rolling bearing) on the basis of determination as to whether an abnormality is present in the rolling bearing and a monitoring peak frequency setting mode of setting a monitoring peak frequency that is a peak frequency to be monitored in the abnormality monitoring mode are provided. The control part 21 makes the storage part 6 store the vibration data detected by the vibration detection parts 1 (1-1 to 1-3) in association with detection times. More specifically, the control part 21 acquires detection results of the vibration detection parts 1 (1-1 to 1-3) at predetermined sampling intervals, and makes the storage part 6 store the acquired detection results in association with the detection times. The detection results depend on the rotational speed of the gear reducer M. Hence, in the embodiment, an unillustrated tachometer, e.g., a pulse generator or rotary encoder, for measuring the rotational speed of the gear reducer M is disposed in the gear reducer M. The control part 21 acquires outputs from the tachometer in synchronization with the detection results of the vibration detection parts 1 (1-1 to 1-3), and makes the storage part 6 store the acquired detection results and the acquired outputs from the tachometer in association with the detection times. In the monitoring peak frequency setting mode, a chronological change in the peak frequency (a chronological change in a setting peak frequency in the monitoring peak frequency setting mode to be described later in the embodiment) is observed. The control part 21 acquires detection results of the vibration detection parts 1 (1-1 to 1-3) and outputs from the tachometer at least twice at the sampling intervals each being a predetermined interval (first interval) for a predetermined time period (predetermined time length). In this manner, at least two detection results of the vibration detection parts 1 (1-1 to 1-3) that are associated with the detection times and are continuous in time series at sampling intervals are acquired as vibration data. Besides, at least two outputs from the tachometer that are associated with the detection times and are continuous in time series at sampling intervals are acquired as rotational speed data. That is to say, the control part 21 acquires the detection results of the vibration detection parts 1 (1-1 to 1-3) and the outputs from the tachometer at the predetermined sampling intervals for the predetermined time period or length, and makes the storage part 6 store the detection results and the outputs continuous in time series at the sampling intervals as vibration data and rotational speed data in association with the detection times. The first time interval is appropriately set to, for example, three months, six months, or twelve months. In the abnormality monitoring mode, a chronological frequency change amount of the peak frequency from the reference frequency (a chronological frequency change amount of a monitoring peak frequency from a reference frequency in the abnormality monitoring mode in the embodiment, which will be described later) is observed. Hence, the control part 21 acquires detection results of the vibration detection parts 1 (1-1 to 1-3) and outputs from the tachometer in synchronization with each other at the sampling intervals, and makes the storage part 6 store the acquired detection results of the vibration detection part 1 (1-1 to 1-3) and the acquired outputs from the tachometer in association with detection times. Further, as described later, past detection results and outputs that are stored in the storage part 6 and continuous in time series at the sampling intervals for a predetermined time period (e.g., one day, three days, or one week) from a current time are retrieved as vibration data and rotational speed data at a time of determining an abnormality, and the past detection results and outputs are used for determination of an abnormality.

In a sensor-less case without using a tachometer, a vibration component attributed to a change in the rotational speed of the gear reducer M may be extracted from the vibration data, and rotational speed data may be generated from the extracted vibration component.

The spectrum processing part 22 obtains a frequency spectrum of the vibration data detected by the vibration detection parts 1 (1-1 to 1-3). More specifically, as preprocessing, the spectrum processing part 22 removes (corrects) an influence of a change in the rotational speed from the vibration data on the basis of the rotational speed data by using a known way, obtains vibration data in a constant rotation of the gear reducer M at a predetermined rotational speed, and performs, for example, fast Fourier transform on the obtained vibration data to obtain a frequency spectrum of the vibration data. In the monitoring peak frequency setting mode, the frequency spectrum is obtained for each piece of vibration data acquired at the first intervals. In the abnormality monitoring mode, vibration data at the time of determining an abnormality is obtained.

The peak frequency detection part 23 detects, from the frequency spectrum obtained by the spectrum processing part 22, a peak frequency that is a frequency showing a peak within a predetermined frequency range including a theoretical frequency showing a peak on the frequency spectrum in an occurrence of an abnormality. The peak frequency detection part 23 detects and specifies a peak frequency that is a setting peak frequency in the monitoring peak frequency setting mode. Specifically, in the monitoring peak frequency setting mode, the peak frequency detection part 23 detects, from the frequency spectrum obtained by the spectrum processing part 22, a setting peak frequency that is a frequency showing a peak within a predetermined frequency range including a theoretical frequency showing a peak on the frequency spectrum in an occurrence of an abnormality. In the embodiment, the peak frequency detection part 23 further detects and specifies, in the monitoring peak frequency setting mode, one or more integer multiple setting peak frequencies that are one or more peak frequencies each being an integer multiple of the setting peak frequency and showing a peak. For example, a two-fold peak frequency showing a peak in a two-fold frequency and a three-fold peak frequency showing a peak in a three-fold frequency are detected and specified. The integer multiple frequency is not limited to the frequencies, and is appropriately set to, for example, two-fold, three-fold, and four-fold frequencies, and three-fold and four-fold frequencies, two-fold and four-fold frequencies, and three-fold and five-fold frequencies. In the embodiment, the peak frequency detection part 23 finally sets a frequency which is settable as the setting peak frequency to the peak frequency for at least two pieces of vibration data among a plurality of pieces of vibration data respectively detected by the vibration detection parts 1.

The theoretical frequency ft showing a peak on the frequency spectrum in an occurrence of an abnormality is known, and varies depending on a portion where a damage of the rolling bearing, i.e., a bearing damage, occurs, and is, for example, as shown in Table 1 below. Examples of the portion of the bearing damage include an inner ring, an outer ring, a rolling element, and a holder. Here, the reference sign "fti" denotes a theoretical frequency in an occurrence of a bearing damage in the inner ring, the reference sign "fto" denotes a theoretical frequency in an occurrence of a bearing damage in the outer ring, the reference sign "ftb" denotes a theoretical frequency in an occurrence of a bearing damage in the rolling element, and the reference sign "ftm" denotes a theoretical frequency in an occurrence of a bearing damage in the holder. The reference sign "d" denotes a diameter of the rolling element, the reference sign "D" denotes a pitch circle diameter of the rolling element, the reference sign "Z" denotes the number of rolling elements, and the reference sign "α" denotes a contact angle.

TABLE 1

| PORTION OF BEARING DAMAGE | THEORETICAL FREQUENCY ft |
|---|---|
| INNER RING $f_{ti}$ | $\frac{Zf_0}{2}\left(1+\frac{d}{D}\cos\alpha\right)$ |
| OUTER RING $f_{to}$ | $\frac{Zf_0}{2}\left(1-\frac{d}{D}\cos\alpha\right)$ |
| ROLLING ELEMENT $f_{tb}$ | $\frac{f_0 D}{2d}\left\{1-\left(\frac{d}{D}\right)^2\cos^2\alpha\right\}$ |
| HOLDER $f_{tm}$ | $\frac{f_0}{2}\left(1-\frac{d}{D}\cos\alpha\right)$ |

The frequency range for detecting the peak frequency (the setting peak frequency in the monitoring peak frequency setting mode, and the monitoring peak frequency in the abnormality monitoring mode) with respect to the theoretical frequencies ft (fti, fto, ftb, ftm) is, for example, ±dft around the theoretical frequency ft, and is set as shown in Table 2 below for one-time to n-times. Here, the operator "*" indicates a multiplication operator. For example, each frequency range for each of one-fold, two-fold, and three-fold theoretical frequencies in an occurrence of a bearing damage in the outer ring indicates fto−dft to fto+dft, 2*fto−2*dft to 2*fto+2*dft, and 3*fto−3*dft to 3*fto+3*dft.

TABLE 2

| | CENTER FREQUENCY | LOWER LIMIT FREQUENCY | UPPER LIMIT FREQUENCY |
|---|---|---|---|
| ONE TIME | ft | ft − dft | ft + dft |
| TWO TIMES | 2*ft | 2*(ft − dft) | 2*(ft + dft) |
| THREE TIMES | 3*ft | 3*(ft − dft) | 3*(ft + dft) |
| FOUR TIMES | 4*ft | 4*(ft − dft) | 4*(ft + dft) |
| . . . | . . . | . . . | . . . |
| n TIMES | n*ft | n*(ft − dft) | n*(ft + dft) |

For specifying a setting peak frequency and an integer multiple setting peak frequency in the monitoring peak frequency setting mode, the peak frequency detection part 23 detects and specifies a setting peak frequency that is a frequency showing a peak in both the frequency spectrum within a frequency range of the theoretical frequency and the frequency spectrum within a frequency range of an integral multiple of the theoretical frequency. For example, one vibration detection part 1 obtains each frequency spectrum shown in FIG. 3 from the vibration data. In this example, such a peak as the peak seen in a frequency f1 in a frequency spectrum (at the top) within the frequency range ft−dft to ft+dft of the theoretical frequency ft is not preset in a frequency 2*f1 that is two times the frequency f1 in a frequency spectrum (at the middle) within the frequency range 2*ft−2*dft to 2*ft+2*dft two times the theoretical frequency ft and the peak is also not present in a frequency 3*f1 that is three times the frequency f1 in a frequency spectrum (at the bottom) within the frequency range 3*ft−3*dft to 3*ft+3*dft three times the theoretical frequency ft. Hence, the peak frequency detection part 23 avoids detecting and specifying the frequency f1 as a setting peak frequency. By contrast, such a peak as the peak seen in a frequency f2 in a frequency spectrum (at the top) within the frequency range ft−dft to ft+dft of the theoretical frequency ft is present in a frequency 2*f2 that is two times the frequency f2 in a frequency spectrum (at the middle) within the frequency range 2*ft−2*dft to 2*ft+2*dft two times the theoretical frequency ft and the peak is also present in a frequency 3*f2 that is three times the frequency f2 in a frequency spectrum (at the bottom) within the frequency range 3*ft−3*dft to 3*ft+3*dft three times the theoretical frequency ft. Hence, the peak frequency detection part 23 detects and specifies the frequency f2 as a setting peak frequency. Execution of such specifying processing, for example, for each peak (e.g., each peak having a level equal to or greater than a predetermined threshold) in the frequency spectrum within the frequency range ft−dft to ft+dft of the theoretical frequency ft achieves specifying of the setting peak frequency and the integer multiple setting peak frequency.

In use of the plurality of vibration detection parts 1 to detect and specify the setting peak frequency and the integer multiple setting peak frequency, the vibrations generated in the rolling bearings BE propagate through the rotation shafts AX, the gears GA, the housing, and other component, and are detected by the vibration detection parts 1. In this respect, the peak frequency detection part 23 detects and specifies a setting peak frequency that is a frequency showing a peak in both the frequency spectrum within the frequency range of the theoretical frequency and the frequency spectrum within the frequency range of the integral multiple of the theoretical frequency for at least two pieces of vibration data among a plurality of pieces of vibration data respectively detected by the vibration detection parts 1. For example, in the three vibration detection parts from the first to third vibration detection parts 1-1 to 1-3, frequency spectrums shown in FIGS. 4A and 4B are obtained from the vibration data. In this Example, first in FIG. 4B, in the first vibration detection part 1-1, such a peak as the peek seen in a frequency f4 in a frequency spectrum (at the top) within the frequency range ft−dft to ft+dft of the theoretical frequency ft is present in a frequency 2*f4 in a frequency spectrum (at the middle) within the frequency range 2*ft−2*dft to 2*ft+2*dft two times the theoretical frequency ft and the peak is also present in a frequency 3*f4 in a frequency spectrum (at the bottom) within the frequency range 3*ft−3*dft to 3*ft+3*dft three times the theoretical frequency ft. The frequency f4 is thus a candidate for the setting peak frequency. However, in the second and third vibration detection parts 1-2 and 1-3, no peak is present in each frequency spectrum (at each top) within the frequency range ft−dft to ft+dft of the theoretical frequency ft, in each frequency spectrum (at each middle) within the frequency range 2*ft−2*dft to 2*ft+2*dft two times the theoretical frequency ft, and in each frequency spectrum (at each bottom) within the frequency range 3*ft−3*dft to 3*ft+3*dft three times the theoretical frequency ft. The peak frequency detection part 23 hence avoids finally detecting and specifying the frequency f4 as a setting peak frequency. By contrast, in FIG. 4A, in the first vibration detection part 1-1, such a peak as the peak seen in a frequency f3 in a frequency spectrum (at the top) within the frequency range ft−dft to ft+dft of the theoretical frequency ft is present in a frequency 2*f3 in a frequency spectrum (at the middle) within the frequency range 2*ft−2*dft to 2*ft+2*dft two times the theoretical frequency ft and the peak is also present in a frequency 3*f3 in a frequency spectrum (at the bottom) within the frequency range 3*ft−3*dft to 3*ft+3*dft three times the theoretical frequency ft. The frequency f3 is thus a candidate for the peak frequency. Further, in the second and third vibration detection parts 1-2 and 1-3, a peak is present in each frequency spectrum (at each top) within the frequency range ft−dft to ft+dft of the theoretical frequency ft, in each frequency spectrum (at each middle) within the frequency range 2*ft−2*dft to 2*ft+2*dft two times the theoretical frequency ft, and in each frequency spectrum (at each bottom) within the frequency range 3*ft−3*dft to 3*ft+3*dft three times the theoretical frequency ft. The peak frequency detection part 23 hence finally detects and specifies the frequency f3 as a peak frequency. Execution of such specifying processing, for example, for each peak (e.g., each peak having a level equal to or greater than a predetermined threshold) in the frequency range ft−dft to ft+dft of the theoretical frequency ft in the frequency spectrum of the vibration data detected by the first vibration detection part 1-1 achieves final detection and specifying of the setting peak frequency. Consequently, the setting peak frequency and the integer multiple setting peak frequency can be specified. Although FIG. 4A shows the peaks present in all the three vibration detection parts from the first to third vibration detection parts 1-1 to 1-3 respectively, peaks may be present in at least two of the vibration detection parts, respectively, as described.

The monitoring target setting part 24 sets, in the monitoring peak frequency setting mode, the setting peak frequency to a monitoring peak frequency of a monitoring target when the setting peak frequency detected and specified by the peak frequency detection part 23 chronologically changes. In the embodiment, the monitoring target setting part 24 further sets and adds at least one of the one or more integer multiple peak frequencies to the monitoring peak frequency when the one or more integer multiple setting peak frequencies detected and specified by the peak frequency detection part 23 chronologically change in synchronization with the chronological change in the setting peak frequency.

For example, as shown in FIG. 5A, a first setting peak frequency a [Hz] and first integer multiple setting peak frequencies 2*a and 3*a [Hz], a second setting peak frequency b [Hz], and second integer multiple setting peak frequencies 2*b and 3*b [Hz] are detected and specified immediately after the new installation or overhaul of the gear reducer M. As shown in FIG. 5B, one year later, respective peaks in the first setting peak frequency a [Hz] and the first integer multiple setting peak frequencies 2*a and 3*a [Hz] synchronously and chronologically change by Δc, 2*Δc, and 3*Δc, respectively, while the second setting peak frequency b [Hz] and the second integer multiple setting peak frequencies 2*b and 3*b [Hz] do not chronologically change. In this example, the monitoring target setting part 24 sets each of the first setting peak frequency a [Hz] and the first integer multiple setting peak frequencies 2*a and 3*a [Hz] to the monitoring peak frequency.

Although the monitoring peak frequency may be set in accordance with one chronological change as described above, the monitoring frequency in the embodiment is set in accordance with a plurality of chronological changes. Specifically, the monitoring target setting part 24 sets the setting peak frequency to the monitoring peak frequency of the monitoring target when the setting peak frequency detected and specified by the peak frequency detection part 23 chronologically changes a plurality of times respectively at a plurality of different time points.

For instance, FIG. 6 shows a result of observing a setting peak frequency detected and specified by the peak frequency detection part 23 a plurality of times at every predetermined interval (a second interval, a follow-up duration) for a monitoring peak frequency setting period for setting the monitoring peak frequency in the monitoring peak frequency setting mode. FIG. 6 shows no change in the second peak frequency b [Hz] (Δ) described above with reference to FIG. 5 and observed at each of times (twelve times for every one-month follow-up duration in this example) for the monitoring peak frequency setting period (one year in this example). By contrast, the first setting peak frequency a [Hz] (●) described above with reference to FIG. 5 gradually and chronologically changes at each time, and chronologically changes a plurality of times. The change in the frequency may decrease as well as increasing, or may discontinuously increase or decrease. The monitoring target setting part 24 sets the first setting peak frequency a [Hz] observed to have a tendency to chronologically change a plurality of times and gradually change at each time to the monitoring peak frequency of the monitoring target. By contrast, the monitoring target setting part 24 avoids setting the second setting peak frequency b [Hz] that does not approximately chronologically change at each time to the monitoring peak frequency of the monitoring target.

The peak frequency detection part 23 detects, in the abnormality monitoring mode, the monitoring peak frequency set by the monitoring target setting part 24. Specifically, the peak frequency detection part 23 detects, from the frequency spectrum obtained by the spectrum processing part 22, the monitoring peak frequency that is a frequency set by the monitoring target setting part 24 and showing a peak within a predetermined frequency range including a theoretical frequency showing a peak on the frequency spectrum in an occurrence of an abnormality.

The frequency change amount processing part 25 obtains a chronological frequency change amount that is a difference between a preset reference frequency being a reference of the peak frequency and the peak frequency detected by the peak frequency detection part 23. In the embodiment, a monitoring peak frequency of a monitoring target to be used in the abnormality monitoring mode is set in the monitoring peak frequency setting mode. Hence, the frequency change amount processing part 25 obtains the chronological frequency change amount that is a difference between the reference frequency and the monitoring peak frequency detected by the peak frequency detection part 23. The preset reference frequency is, for example, a monitoring peak frequency in a healthy state of the rolling bearing. The healthy state of the rolling bearing indicates a state of no abnormality in the rolling bearing (the mechanical implement including the rolling bearing), for example, a state immediately after new installation of the rolling bearing (the mechanical implement including the rolling bearing), i.e., at a new installation time, or immediately after overhaul of the rolling bearing (the mechanical implement including the rolling bearing), i.e., at an overhauling time.

The abnormality determination part 26 determines, on the basis of the chronological frequency change amount obtained by the frequency change amount processing part 25, whether an abnormality is present in the rolling bearing. In the embodiment, the abnormality determination part 26 determines whether an abnormality is present in the rolling bearing on the basis of a predetermined threshold to be set with reference to the reference frequency (the monitoring peak frequency in the healthy state of the rolling bearing in the example). More specifically, the abnormality determination part 26 obtains a chronological frequency change rate on the basis of the chronological frequency change amount obtained by the frequency change amount processing part 25, and determines whether an abnormality is present in the rolling bearing by comparing the obtained chronological frequency change rate with the predetermined threshold.

The chronological frequency change rate Δf is obtained by dividing a subtraction result of subtracting the reference frequency f0 from the monitoring peak frequency f1 by the reference frequency f0 to be dimensionless, $\Delta f=(f1-f0)/f0$. The threshold may be appropriately set on the basis of the reference frequency, for example, may be set to ±0.3 [%] or ±0.6 [%] with reference to, for example, the reference frequency f0 set to "0". The abnormality determination part 26 determines an abnormality when the chronological frequency change amount exceeds the threshold, and determines no abnormality when the chronological frequency change amount does not exceed the threshold.

In the example shown in FIG. 7, the threshold includes a first threshold±Th1 (e.g., ±0.6[%]) for determining presence or absence of an abnormality, and additionally, a second threshold±Th2 (e.g., ±0.3[%]) for determining a sign of an abnormality (reference $0<|\pm Th2|<|\pm Th1|$). The abnormality determination part 26 determines that no abnormality is present when the chronological frequency change rate Δf based on the chronological frequency change amount obtained by the frequency change amount processing part 25 does not exceed the second threshold+Th2 ($\Delta f \leq \pm Th2$), determines that no abnormality is present when the chronological frequency change rate Δf does not fall below the second threshold−Th2 ($\Delta f \geq -Th2$). The abnormality determination part 26 determines that a sign of an abnormality is present when the chronological frequency change rate Δf does not exceed the first threshold+Th1 ($\Delta f \leq +Th1$) and the chronological frequency change rate Δf exceeds the second threshold+Th2 ($\Delta f > \pm Th2$), and determines that a sign of an abnormality is present when the chronological frequency change rate Δf does not fall below the first threshold−Th1 ($\Delta f \geq -Th1$) and the chronological frequency change rate Δf falls below the second threshold−Th2 ($\Delta f < -Th2$). The abnormality determination part 26 determines that an abnormality is present when the chronological frequency change rate Δf exceeds the first threshold+Th1 ($\Delta f > +Th1$) and determines that an abnormality is present when the chronological frequency change rate Δf falls below the first threshold−Th1 ($\Delta f < -Th1$).

Here, in FIG. 7, the solid line denotes a chronological frequency change rate Inn of a monitoring peak frequency related to the inner ring, a relatively short dashed line ". . . " denotes a chronological frequency change rate Out of a monitoring peak frequency related to the outer ring, and a relatively long dashed line "_ _ _" denotes a chronological frequency change rate Rol of a monitoring peak frequency related to the rolling element, and a dash-dotted line denotes a chronological frequency change rate Ret of a monitoring peak frequency related to the holder.

The warning notification part 27 makes a notification of a warning to an outside by outputting the warning from the output part 4 when the abnormality determination part 26 determines that an abnormality is present in the rolling bearing. The example described above further includes determination of a sign of the abnormality in the same manner. In this example, the warning notification part 27 outputs a warning of a sign of an abnormality from the output part 4 when it is determined that such a sign is present on the basis of determination as to whether the sign is present as well as outputting a warning of an abnormality from the output part 4 when it is determined that the abnormality is present on the basis of determination as to whether the abnormality is present. For instance, the rolling bearing abnormality detection device VD obtains a chronological frequency change amount in a monitoring peak frequency from the reference frequency at a predetermined time interval, e.g., one day or one week, and compares a chronological frequency change rate Δf based on the obtained chronological frequency change amount with each of the first and second thresholds±Th1 and ±Th2. On the basis of the comparison, the rolling bearing abnormality detection device VD causes the output part 4 to output a warning of an abnormality when determining the abnormality, causes the output part 4 to output a warning of a sign when determining the sign of an abnormality, or causes the output part 4 to output an abnormality absence notice or a sign absence notice when determining no abnormality or no sign of an abnormality. The process may finish without outputting the abnormality absence notice or the sign absence notice. Examples of the warning of an abnormality include a color display (e.g., a red display), a voice output of a voice message (e.g., saying "An abnormality is present in the rolling bearing."), and a display of a text message (e.g., "Danger"). Examples of the warning of a sign include a color display (e.g., an yellow display) in a color different from the color in the color display for the warning of the abnormality, a voice output of a voice message (e.g., saying "A sign of an abnormality is present in the rolling bearing.") different from the voice message for the warning of the abnormality, and a display of a text message (e.g., "Warning") different from the text message for the warning of the abnormality. In this manner, the output part 4 outputs a warning of an abnormality and outputs a warning of a sign in their respective ways different from each other.

The control processor 2, the input part 3, the output part 4, the IF part 5, and the storage part 6 are configurable by, for example, a desktop computer, a lap-top computer, or a tablet computer.

Figure 8:
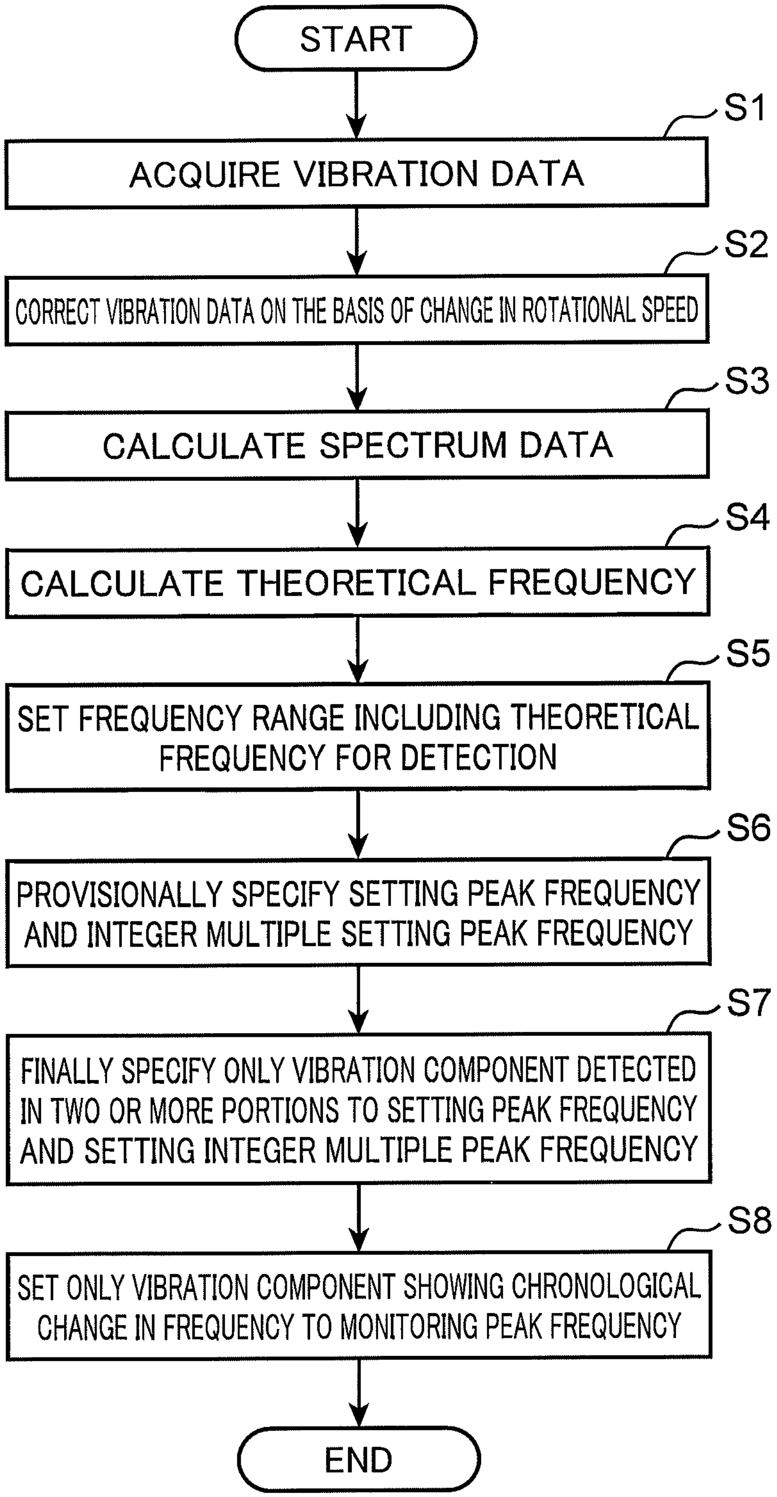
FIG. 8 is a flowchart showing an operation of the rolling bearing abnormality detection device in a monitoring peak frequency setting mode.
Figure 9:
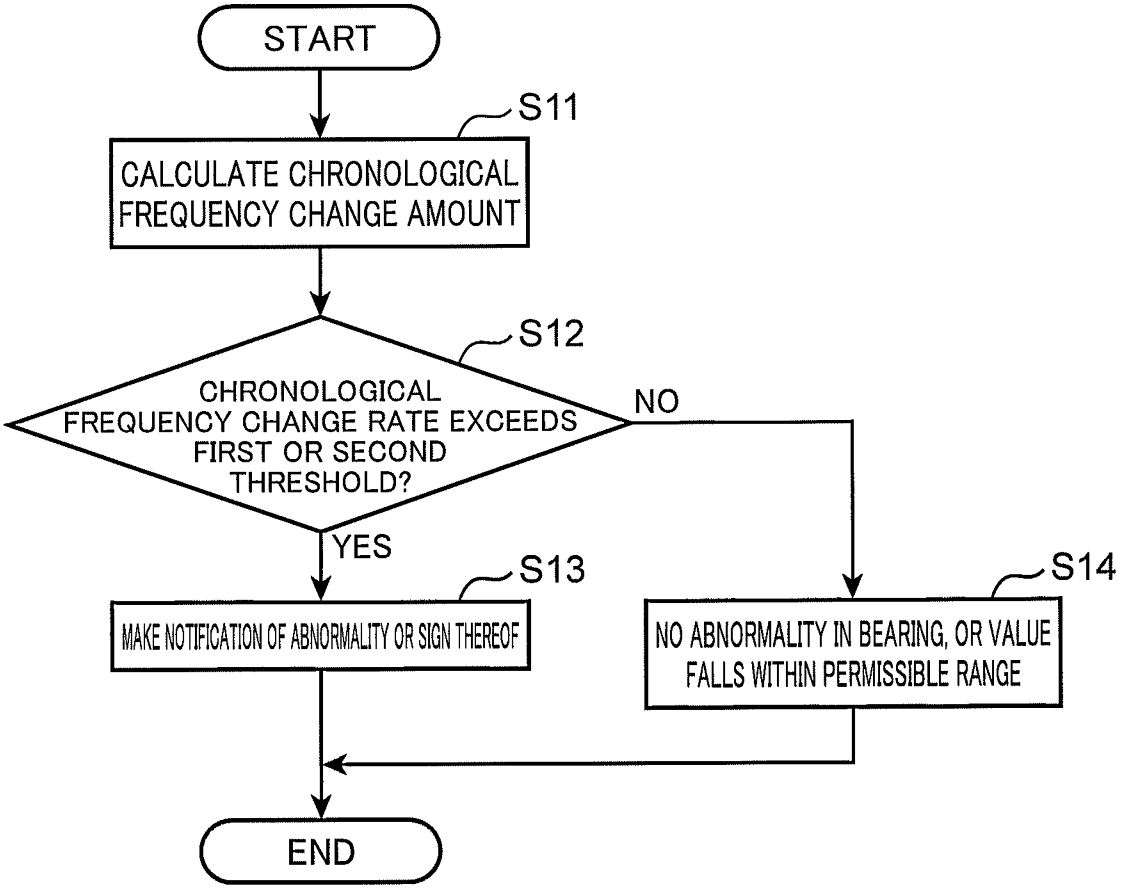
FIG. 9 is a flowchart showing an operation of the rolling bearing abnormality detection device in an abnormality monitoring mode.

Next, an operation in the embodiment will be described. FIG. 8 is a flowchart showing an operation of the rolling bearing abnormality detection device in the monitoring peak frequency setting mode. FIG. 9 is a flowchart showing an operation of the rolling bearing abnormality detection device in the abnormality monitoring mode.

The rolling bearing abnormality detection device VD having this configuration is powered on to execute initialization of each part which is necessary and start an operation of each part. The control processor 2 is configured to functionally include the control part 21, the spectrum processing part 22, the peak frequency detection part 23, the monitoring target setting part 24, the frequency change amount processing part 25, the abnormality determination part 26, and the warning notification part 27 by executing the control processing programs.

The rolling bearing abnormality detection device VD in the embodiment determines presence or absence of an abnormality in the rolling bearing after setting the monitoring peak frequency, as described above. For the determination, first, an operation of the rolling bearing abnormality detection device VD for a setting of a monitoring peak frequency in the monitoring peak frequency setting mode will be described. Secondly, an operation of the rolling bearing abnormality detection device VD for determination on presence or absence of an abnormality in the rolling bearing in the abnormality monitoring mode will be described.

For instance, each of steps S1 to S7 shown in FIG. 8 is executed in a healthy state immediately after overhaul, and the storage part 6 stores a peak frequency in the healthy state to be a reference of a setting peak frequency or an integer multiple setting peak frequency showing a chronological change.

Further, for example, each of steps S1 to S8 shown in FIG. 8 is repeatedly executed in each follow-up observation duration for a monitoring peak frequency setting period in response to designation of the monitoring peak frequency setting mode and an input to start the mode into the input part 3.

In FIG. 8, the rolling bearing abnormality detection device VD first causes the control part 21 of the control processor 2 to acquire detection results of the vibration detection parts 1 (1-1 to 1-3) and outputs from the tachometer at predetermined sampling intervals for a predetermined time period, and causes the storage part 6 to store the detection results and outputs continuous in time series at the sampling intervals as vibration data and rotational speed data in association with detection times (S1).

Next, the rolling bearing abnormality detection device VD causes the spectrum processing part 22 of the control processor 2 to remove (correct) an influence of a change in the rotational speed from the vibration data on the basis of the rotational speed data and obtain vibration data in a constant rotation of the gear reducer M at a predetermined rotational speed, and causes the storage part 6 to store the vibration data (S2).

Subsequently, the rolling bearing abnormality detection device VD causes the spectrum processing part 22 to obtain a frequency spectrum of the obtained vibration data, and causes the storage part 6 to store the frequency spectrum (S3).

Then, the rolling bearing abnormality detection device VD causes the peak frequency detection part 23 of the control processor 2 to obtain a theoretical frequency ft showing a peak on the frequency spectrum in an occurrence of an abnormality as shown in Table 1, and causes the storage part 6 to store the theoretical frequency ft (S4). The theoretical frequency ft may be obtained in advance and stored in the storage part 6 to be used.

Thereafter, the rolling bearing abnormality detection device VD causes the peak frequency detection part 23 to obtain a frequency range including the theoretical frequency ft for detecting a setting peak frequency and a frequency range including an integer multiple of the theoretical frequency ft for detecting an integer multiple setting peak frequency as shown in Table 2, and causes the storage part 6 to store the obtained frequency ranges (S5). These frequency ranges may be obtained in advance and stored in the storage part 6 to be used.

Next, the rolling bearing abnormality detection device VD causes the peak frequency detection part 23 to temporarily specify the setting peak frequency and the integer multiple setting peak frequency in the processing described above with reference to FIG. 3, and causes the storage part 6 to store the specified setting frequencies (S6).

Subsequently, the rolling bearing abnormality detection device VD causes the peak frequency detection part 23 to specify a final setting peak frequency and a final integer multiple setting peak frequency in the processing described above with reference to FIG. 4, and causes the storage part 6 to store the specified peak frequencies (S7).

Then, the rolling bearing abnormality detection device VD causes the monitoring target setting part 24 of the control processor 2 to set a monitoring peak frequency in the processing described above with reference to FIG. 6, and causes the storage part 6 to store the monitoring peak frequency (S8). Here, for example, the monitoring peak frequency set at the end of the monitoring peak frequency setting period is finally set as a monitoring peak frequency.

In such processing, the monitoring peak frequency is set and customized for an actual machine of a mechanical implement including a rolling bearing.

After the setting of the monitoring peak frequency, first, an operator or a user sets first and second thresholds Th1 and Th2 to be stored. For instance, each of steps S11 to S14 shown in FIG. 9 is repeatedly executed, for example, at a starting time in an operation of eight hours per day, or on every half day or every day in a continuous operation of twenty-four hours in response to designation of the abnormality monitoring mode and an input to start the mode into the input part 3.

In the setting of the first and second thresholds Th1 and Th2, the mechanical implement in a healthy state is rotated at a constant speed, a monitoring peak frequency is obtained, and the first and second thresholds±Th1 and ±Th2 are set and stored in the storage part 6. Here, in step S8, such a peak frequency in the healthy state as corresponding to the monitoring peak frequency set in step S8 and stored in the storage part 6 to be a reference in a chronological change in a setting peak frequency or an integer multiple setting peak frequency as described above may be set to a monitoring peak frequency f1.

In FIG. 9, the rolling bearing abnormality detection device VD causes the control part 21, the spectrum processing part 22, and the peak frequency detection part 23 of the control processor 2 to obtain a monitoring peak frequency, and causes the frequency change amount processing part 25 of the control processor 2 to obtain a chronological frequency change amount (S11). More specifically, the control part 21 obtains vibration data on the basis of respective detections results of the first to third vibration detection parts 1-1 to 1-3. The spectrum processing part 22 obtains each frequency spectrum of each piece of the vibration data. The peak frequency detection part 23 searches for a peak corresponding to the monitoring peak frequency from each frequency spectrum. The frequency change amount processing part 25 obtains a chronological frequency change amount on the basis of each searched frequency showing the peak from, for example, a one-hold monitoring peak frequency.

Next, the rolling bearing abnormality detection device VD causes the abnormality determination part 26 of the control processor 2 to determine whether the chronological frequency change rate Δf based on the chronological frequency change amount obtained in step S11 exceeds the first threshold±Th1 or the second threshold±Th2. As a result of the determination, the rolling bearing abnormality detection device VD executes step S13 and finishes the process, when the chronological frequency change rate Δf exceeds the first threshold±Th1 or the second threshold±Th2 (YES), that is, when the chronological frequency change rate Δf exceeds the second threshold±Th2, when the chronological frequency change rate Δf falls below the second threshold−Th2, when the chronological frequency change rate Δf exceeds the first threshold+Th1, or when the chronological frequency change rate Δf falls below the first threshold−Th1. By contrast, as a result of the determination, the rolling bearing abnormality detection device VD executes step S14 and finishes the process, when the chronological frequency change rate Δf does not exceed the first threshold Th1 and the chronological frequency change rate Δf does not exceed the second threshold±Th2 (NO), that is, when the chronological frequency change rate Δf is not higher than the second threshold+Th2 and is not lower than the second threshold−Th2.

In step S13, the rolling bearing abnormality detection device VD determines a sign of an abnormality when the chronological frequency change amount exceeds the second threshold±Th2 and does not exceed the first threshold±Th1, that is, when the chronological frequency change amount exceeds the second threshold±Th2 and is not higher than the first threshold±Th1, or when the chronological frequency change amount falls below the second threshold−Th2 and is not lower than the first threshold−Th1. The warning notification part 27 of the control processor 2 outputs a warning of the sign from the output part 4 to make a notification. An abnormality is determined when the chronological frequency change amount exceeds the first threshold±Th2, that is, when the chronological frequency change amount exceeds the first threshold±Th2 or the chronological frequency change amount falls below the first threshold−Th1. The warning notification part 27 of the control processor 2 outputs a warning of the abnormality from the output part 4 for making a notification.

In step S14, the rolling bearing abnormality detection device VD causes the warning notification part 27 to output an abnormality absence notice and a sign absence notice (to indicate that a value falls within a permissible range) from the output part 4.

Through such processing, the rolling bearing (the mechanical implement including the rolling bearing) is monitored to determine presence or absence of a sign of an abnormality and determine presence or absence of an abnormality, and a result of the determination is output.

As described heretofore, a rolling bearing abnormality detection device DV and a rolling bearing abnormality detection method for the device in the embodiment include determining presence or absence of an abnormality in a rolling bearing on the basis of a chronological frequency change amount regarding a peak frequency. In other words, it is determined in the embodiment as to whether an abnormality is present in the rolling bearing on the basis of a chronological frequency change rate based on a chronological frequency change amount regarding the peak frequency. This eliminates the need for use of a degree of a vibration which varies depending on a structure of an implement including the rolling bearing, and thus achieves appropriate detection of an abnormality in the rolling bearing. A theoretical frequency showing a peak on a frequency spectrum in an occurrence of an abnormality is logically calculatable from a calculation formula. The rolling bearing abnormality detection device VD and the rolling bearing abnormality detection method include setting a predetermined frequency range for detecting a peak frequency on the basis of the theoretical frequency that is logically calculatable, and hence, enable more appropriate setting of the predetermined frequency range.

The rolling bearing abnormality detection device VD and the rolling bearing abnormality detection method enable a notification of a warning about presence of an abnormality in the rolling bearing to an outside owing to the warning notification part 27. The user having recognized the warning notified to the outside can recognize the presence of the abnormality in the rolling bearing.

In reality, such a rolling bearing may involve various vibrations attributed to, for example, gears meshed with each other, a side band thereof, and a multiple component (harmonic component) of a shaft rotation in addition to the vibration of the rolling bearing. The frequency of the vibration in the rolling bearing chronologically changes due to abrasion or other factor. The rolling bearing abnormality detection device VD and the rolling bearing abnormality detection method include setting a setting peak frequency to a monitoring peak frequency when the setting peak frequency chronologically changes, and thus enable appropriate detection of a vibration in the rolling bearing.

The rolling bearing abnormality detection device VD and the rolling bearing abnormality detection method include setting and adding at least one of one or more integer multiple peak frequencies each being an integer multiple of the setting peak frequency and showing a peak to the monitoring peak frequency, and thus enable more appropriate detection of a vibration in the rolling bearing. The rolling bearing abnormality detection device VD and the rolling bearing abnormality detection method accordingly achieve more appropriate determination as to whether an abnormality is present in the rolling bearing.

The rolling bearing abnormality detection device VD and the rolling bearing abnormality detection method include setting frequencies each showing a peak and being detectable by at least two vibration detection parts 1 to each monitoring peak frequency, and thus facilitate distinction between a peak in a monitoring peak frequency and a noise even when the peak in the monitoring peak frequency is low and achieve appropriate detection of the vibration in the rolling bearing.

The rolling bearing abnormality detection device VD and the rolling bearing abnormality detection method include setting the setting peak frequency to the monitoring peak frequency when the peak frequency chronologically changes a plurality of times respectively at a plurality of different time points, and thus enable elimination of a temporal chronological change in the frequency and achieve more appropriate setting of the monitoring peak frequency of a monitoring target.

Various aspects of technologies are disclosed in this specification as described above. Main technologies among them will be summarized below.

A rolling bearing abnormality detection device according to one aspect includes: a vibration detection part that detects a vibration in a rolling bearing as vibration data; a spectrum processing part that obtains a frequency spectrum of the vibration data detected by the vibration detection part; a peak frequency detection part that detects, from the frequency spectrum obtained by the spectrum processing part, a peak frequency that is a frequency showing a peak within a predetermined frequency range including a theoretical frequency showing a peak on the frequency spectrum in an occurrence of an abnormality; a frequency change amount processing part that obtains a chronological frequency change amount that is a difference between a preset reference frequency being a reference of the peak frequency and the peak frequency detected by the peak frequency detection part; and an abnormality determination part that determines, on the basis of the chronological frequency change amount obtained by the frequency change amount processing part, whether an abnormality is present in the rolling bearing. Preferably, in the rolling bearing abnormality detection device, the reference frequency is a peak frequency in a healthy state of the rolling bearing.

The rolling bearing abnormality detection device determines whether an abnormality is present in the rolling bearing on the basis of a chronological frequency change amount regarding a peak frequency. This eliminates the need for use of a degree of a vibration which varies depending on a structure of an implement including the rolling bearing, and thus achieves appropriate detection of an abnormality in the rolling bearing. A theoretical frequency showing a peak on a frequency spectrum in an occurrence of an abnormality is logically calculatable from a calculation formula. The rolling bearing abnormality detection device sets a predetermined frequency range for detecting a peak frequency on the basis of the theoretical frequency that is logically calculatable, and hence, enables more appropriate setting of the predetermined frequency range.

In another aspect, the rolling bearing abnormality detection device further includes a warning notification part that makes a notification of a warning to an outside when the abnormality determination part determines that an abnormality is present in the rolling bearing.

The rolling bearing abnormality detection device further including the warning notification part can make a notification of a warning about a presence of the abnormality in the rolling bearing abnormality detection device to an outside. The user having recognized the warning notified to the outside can recognize the presence of the abnormality in the rolling bearing.

In another aspect, in the rolling bearing abnormality detection device, an abnormality monitoring mode of monitoring the rolling bearing on the basis of the determination as to whether an abnormality is present in the rolling bearing and a monitoring peak frequency setting mode of setting a monitoring peak frequency that is a peak frequency to be monitored in the abnormality monitoring mode are provided. The peak frequency detection part detects a peak frequency that is a setting peak frequency in the monitoring peak frequency setting mode. The rolling bearing abnormality detection device further includes a monitoring target setting part that sets, in the monitoring peak frequency setting mode, the setting peak frequency to the monitoring peak frequency when the setting peak frequency detected by the peak frequency detection part chronologically changes. The peak frequency detection part detects, in the abnormality monitoring mode, the monitoring peak frequency set by the monitoring target setting part.

In reality, such a rolling bearing may involve various vibrations attributed to, for example, gears meshed with each other, a side band thereof, and a multiple component (harmonic component) of a shaft rotation in addition to the vibration of the rolling bearing. The frequency of the vibration in the rolling bearing chronologically changes due to abrasion or other factor. The present invention has been achieved by focusing on this chronological change. The rolling bearing abnormality detection device sets the setting peak frequency to the monitoring peak frequency, and thus enables appropriate detection of the vibration in the rolling bearing.

In another aspect, in the rolling bearing abnormality detection device, the peak frequency detection part further detects, in the monitoring peak frequency setting mode, one or more integer multiple setting peak frequencies that are one or more peak frequencies each being an integer multiple of the setting peak frequency and showing a peak. The monitoring target setting part further sets and adds at least one of the one or more integer multiple peak frequencies to the monitoring peak frequency when the one or more integer multiple setting peak frequencies detected by the peak frequency detection part chronologically change in synchronization with the chronological change in the setting peak frequency.

The rolling bearing abnormality detection device sets and adds at least one of one or more integer multiple peak frequencies each being an integer multiple of the setting peak frequency and showing a peak to the monitoring peak frequency, and thus enables more appropriate detection of a vibration in the rolling bearing.

In another aspect, in the rolling bearing abnormality detection device, a plurality of vibration detection parts is provided. The peak frequency detection part finally sets a frequency which is detectable as the setting peak frequency to the monitoring peak frequency for at least two pieces of vibration data among a plurality of pieces of vibration data respectively detected by the vibration detection parts.

The rolling bearing abnormality detection device sets frequencies each showing a peak and being detectable by at least two vibration detection parts to the monitoring peak frequency, and thus facilitates distinction between a peak in a monitoring peak frequency and a noise even when the peak in the monitoring peak frequency is low and achieves appropriate detection of the vibration in the rolling bearing.

In another aspect, in the rolling bearing abnormality detection device, the monitoring target setting part sets the setting peak frequency to the monitoring peak frequency when the peak frequency detected by the peak frequency detection part chronologically changes a plurality of times respectively at a plurality of different time points.

The rolling bearing abnormality detection device sets the setting peak frequency to the monitoring peak frequency when the peak frequency chronologically changes a plurality of times respectively at a plurality of different time points, and thus enables exclusion of a temporal chronological change in the frequency and achieves more appropriate setting of the monitoring peak frequency of the monitoring target.

A rolling bearing abnormality detection method according to another aspect includes: a vibration detection step of detecting a vibration in a rolling bearing as vibration data; a spectrum processing step of obtaining a frequency spectrum of the vibration data detected in the vibration detection step; a peak frequency detection step of detecting, from the frequency spectrum obtained in the spectrum processing step, a peak frequency that is a frequency showing a peak within a predetermined frequency range including a theoretical frequency showing a peak on the frequency spectrum in an occurrence of an abnormality; a frequency change amount processing step of obtaining a chronological frequency change amount that is a difference between a preset reference frequency being a reference of the peak frequency and the peak frequency detected in the peak frequency detection step; and an abnormality determination step of determining, on the basis of the chronological frequency change amount obtained in the frequency change amount processing step, whether an abnormality is present in the rolling bearing.

The rolling bearing abnormality detection method includes determining whether an abnormality is present on the basis of a chronological frequency change amount regarding a peak frequency. This eliminates the need for use of a degree of a vibration which varies depending on a structure of an implement including the rolling bearing, and thus achieves appropriate detection of an abnormality in the rolling bearing. The rolling bearing abnormality detection method includes setting a predetermined frequency range for detecting a peak frequency on the basis of the theoretical frequency that is logically calculatable, and hence, enables more appropriate setting of the predetermined frequency range.

This application is based on Japanese Patent Application No. 2021-212423 filed in Japan Patent Office on Dec. 27, 2021, and includes contents thereof.

Although the present invention has been fully described by way of the embodiments and examples with reference to the above-described specific examples, it is to be understood that various changes and/or modifications to the embodiments and examples will be apparent to those skilled in the art. Therefore, unless otherwise such changes and modifications to be made by those skilled in the art depart from the scope of the present invention hereinafter defined, they should be construed as being included therein.

INDUSTRIAL APPLICABILITY

The present invention provides a rolling bearing abnormality detection device and a rolling bearing abnormality detection method for detecting an abnormality occurring in a rolling bearing.

The invention claimed is:

1. A rolling bearing abnormality detection device, comprising:

a vibration sensor that detects a vibration in a rolling bearing as vibration data;

a spectrum processing part that obtains a frequency spectrum of the vibration data detected by the vibration sensor;

a peak frequency detection part that detects, from the frequency spectrum obtained by the spectrum processing part, a peak frequency that is a frequency showing a peak within a predetermined frequency range including a theoretical frequency showing a peak on the frequency spectrum in an occurrence of an abnormality;

a frequency change amount processing part that obtains a chronological frequency change amount that is a difference between a preset reference frequency being a reference of the peak frequency and the peak frequency detected by the peak frequency detection part;

an abnormality determination part that determines, on the basis of the chronological frequency change amount obtained by the frequency change amount processing part, whether an abnormality is present in the rolling bearing; and a warning notification part that makes a notification of a warning to an outside in a first way when the abnormality determination part determines that an abnormality is present in the rolling bearing, wherein the abnormality determination part:

obtains a chronological frequency change rate on the basis of the chronological frequency change amount obtained by the frequency change amount processing part and a predetermined reference frequency;

compares the obtained chronological frequency change rate with a first upper threshold and a first lower threshold for determining presence or absence of an abnormality and a second upper threshold and a second lower threshold for determining a sign of an abnormality and having an absolute value smaller than an absolute value of the first upper and lower thresholds;

determines that a sign of an abnormality is present when the chronological frequency change rate does not exceed the first upper threshold and the chronological frequency change rate exceeds the second upper threshold;

determines that a sign of an abnormality is present when the chronological frequency change rate does not fall below the first lower threshold and the chronological frequency change rate falls below the second lower threshold;

determines that an abnormality is present when the chronological frequency change rate exceeds the first upper threshold;

determines that an abnormality is present when the chronological frequency change rate falls below the first lower threshold; and the warning notification part further makes a notification of a warning to an outside in a second way different from the first way when the abnormality determination part determines that a sign of an abnormality is present in the rolling bearing.

2. The rolling bearing abnormality detection device according to claim 1, wherein an abnormality monitoring mode of monitoring the rolling bearing on the basis of the determination as to whether an abnormality is present in the rolling bearing and a monitoring peak frequency setting mode of setting a monitoring peak frequency that is a peak frequency to be monitored in the abnormality monitoring mode are provided, and the peak frequency detection part detects a peak frequency that is a setting peak frequency in the monitoring peak frequency setting mode, the rolling bearing abnormality detection device further comprising a monitoring target setting part that sets, in the monitoring peak frequency setting mode, the setting peak frequency to the monitoring peak frequency when the setting peak frequency detected by the peak frequency detection part chronologically changes, wherein the peak frequency detection part detects, in the abnormality monitoring mode, the monitoring peak frequency set by the monitoring target setting part.

3. The rolling bearing abnormality detection device according to claim 2, wherein the peak frequency detection part further detects, in the monitoring peak frequency setting mode, one or more integer multiple setting peak frequencies that are one or more peak frequencies each being an integer multiple of the setting peak frequency and showing a peak, and the monitoring target setting part further sets and adds at least one of the one or more integer multiple peak frequencies to the monitoring peak frequency when the one or more integer multiple setting peak frequencies detected by the peak frequency detection part chronologically change in synchronization with the chronological change in the setting peak frequency.

4. The rolling bearing abnormality detection device according to claim 2, wherein a plurality of the vibration sensors is provided, and the peak frequency detection part finally sets a frequency which is detectable as the setting peak frequency to the monitoring peak frequency for at least two pieces of vibration data among a plurality of pieces of vibration data respectively detected by the vibration sensors.

5. The rolling bearing abnormality detection device according to claim 2, wherein the monitoring target setting part sets the setting peak frequency to the monitoring peak frequency when the peak frequency detected by the peak frequency detection part chronologically changes a plurality of times respectively at a plurality of different time points.

6. A rolling bearing abnormality detection method, comprising:

detecting a vibration in a rolling bearing as vibration data;

obtaining a frequency spectrum of the vibration data detected in the vibration detection step;

detecting, from the frequency spectrum, a peak frequency that is a frequency showing a peak within a predetermined frequency range including a theoretical frequency showing a peak on the frequency spectrum known to be associated with an occurrence of an abnormality;

obtaining a chronological frequency change amount that is a difference between a preset reference frequency being a reference of the peak frequency and the detected peak frequency;

an abnormality determination step of determining, on the basis of the obtained chronological frequency change amount, whether an abnormality is present in the rolling bearing; wherein in the determination whether an abnormality is present, a chronological frequency change rate is obtained on the basis of the obtained chronological frequency change amount and a predetermined reference frequency;

the obtained chronological frequency change rate is compared with a first upper threshold and a first lower threshold for determining presence or absence of an abnormality and a second upper threshold and a second lower threshold for determining a sign of an abnormality and having an absolute value smaller than an absolute value of the first upper and lower thresholds;

the presence of a sign of an abnormality is determined when the chronological frequency change rate does not exceed the first upper threshold and the chronological frequency change rate exceeds the second upper threshold;

the presence of a sign of an abnormality is determined when the chronological frequency change rate does not fall below the first lower threshold and the chronological frequency change rate falls below the second lower threshold;

the presence of an abnormality is determined when the chronological frequency change rate exceeds the first upper threshold; and the presence of an abnormality is determined when the chronological frequency change rate falls below the first lower threshold.

* * * * *